E. SPRAGUE, Jr.
COFFEE MAKING DEVICE.
APPLICATION FILED JAN. 17, 1921.
1,431,603.  Patented Oct. 10, 1922.
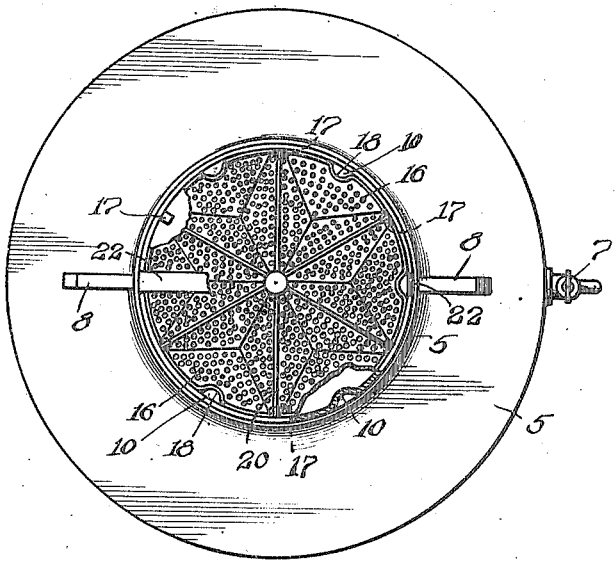
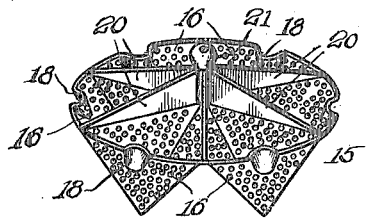
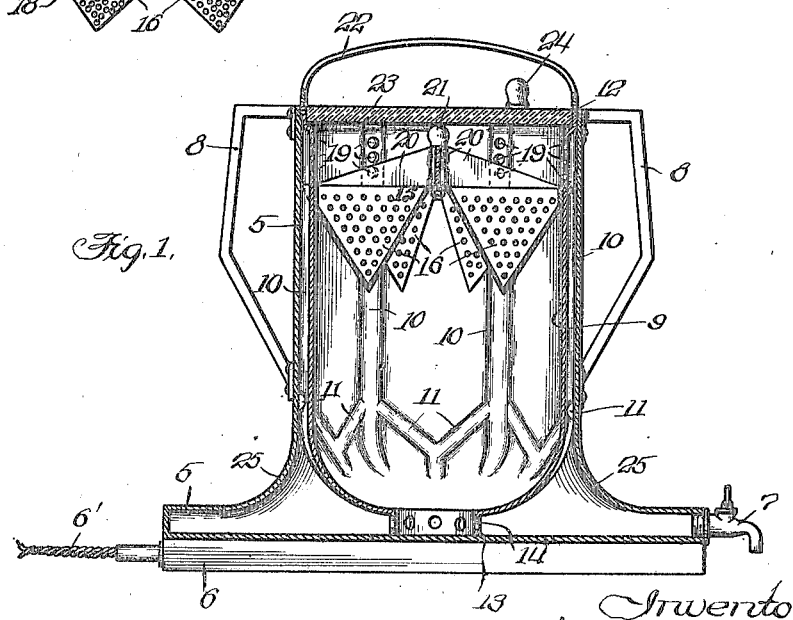
Inventor:
Edward Sprague Jr.
By Jones, Addington, Ames & Seibold
Attys.

Patented Oct. 10, 1922.

1,431,603

UNITED STATES PATENT OFFICE.

EDWARD SPRAGUE, JR., OF EVANSTON, ILLINOIS, ASSIGNOR OF ONE-HALF TO RICHARD RIPPER, OF CHICAGO, ILLINOIS.

COFFEE-MAKING DEVICE.

Application filed January 17, 1921. Serial No. 437,848.

*To all whom it may concern:*

Be it known that I, EDWARD SPRAGUE, Jr., a citizen of the United States, residing at Evanston, in the county of Cook and State of Illinois, have invented new and useful Improvements in Coffee-Making Devices, of which the following is a full, clear, concise, and exact description, reference being had to the accompanying drawing, forming a part of this specification.

My invention relates to coffee-making devices, that is, to devices through the medium of which the flavor of crushed or broken coffee-beans may be extracted and mingled with a liquid to produce the beverage commonly known as coffee.

The object of my invention is the production of a device of the character mentioned whereby coffee of the highest quality and flavor may be produced conveniently, expeditiously and economically.

A further object is the production of a coffee-making device which will be of durable and economical construction and in which the parts will be readily accessible for cleaning.

A still further object is the production of a device as mentioned whereby various combinations of different grades or kinds of coffee-beans may be conveniently tested or experimented with to produce varying flavors of coffee to suit individual tastes.

Other objects will appear hereinafter.

With these objects in view, the invention consists in the combinations and arrangements of parts hereinafter described and claimed.

In the accompanying drawing—

Fig. 1 is a central vertical section of a coffee-making device embodying the invention;

Fig. 2 is a top plan view of the same with parts broken away and the cover of the device removed in order to expose underlying parts; and Fig. 3 is a perspective view of the holder for the granulated coffee beans, removed.

The preferred form of construction, as illustrated in the drawing, comprises a receptacle 5 having a broad circular base comparatively shallow at the peripheral portion thereof. Said receptacle is mounted upon a suitable heating element 6, that shown in the drawing being electrical, the same being provided with suitable conductor wires $6^1$.

The base of receptacle 5 is provided with a suitably valved outlet faucet 7, and at the upper end of said receptacle are provided suitable handles 8.

Removably arranged within the contracted cylindrically formed upper portion of receptacle 5 is a container 9 which fits snugly within the former. Pressed into the sides of container 9 at suitable intervals are vertically extending ribs or beads which, together with the adjacent wall of receptacle 5, form vertical passages 10. The lower ends of said ribs extend partway around the curved lower end of container 9, thus serving to reinforce the same, lending rigidity thereto. Bypasses or tributaries 11 are also provided in the lower portion of container 9 which communicate with the passages 10.

The upper portion 12 of the container 9 is in screw-threaded engagement with the receptacle 5, thus forming a tight connection between the two parts, preventing any leakage at this point and serving to firmly, though detachably, connect the parts together. The bottom of container 9 is open, the same being formed with a depending flange 13 in which are provided spaced openings 14.

Arranged in the upper portion of container 9 is a holder 15 for the ground coffee-beans. Said holder 15 is formed of a plurality of upwardly opening, perforated or foraminated compartments 16, said compartments being radially disposed and each being of downwardly tapering inverted pyramidal form. Preferably, each of said compartments has three sides arranged in the form of an inverted triangular pyramid. The holder 15 is removably supported in container 9 by inwardly projecting studs or supports 17 provided in said container on which said holder is adapted to rest, as will be readily understood. In order to accommodate the ribs in container 9 which form the passages 10, the outer sides of compartments 16 are depressed or indented as at 18.

The holder 15 is spaced below the upper edge of container 9 and provided above the same opposite each of the compartments 16 are three vertically spaced openings 19 which lead from the corresponding passage 10. The arrangement is such that in the operation of the device, liquid rising in the passages 10 will be discharged through openings 19 laterally into the compartments 16. Each compartment 16 will thus be supplied with liquid delivered thereto from the set of openings 19 opposite the same, and in order to prevent the liquid discharged from one set of openings 19 being deposited in adjoining compartments, radial flanges or guards 20 are provided between adjacent compartments. Said flanges are of greatest height at the center of the holder, tapering outwardly, as clearly seen in Figs. 1 and 3. To facilitate handling of holder 15, a suitable knob or handle 21 is provided at the upper end thereof.

The container 9 is provided at its upper end with a suitable handle or bail 22 whereby the same may be readily rotated in connecting or disconnecting the same, as will be readily understood. The upper end of container 9 is closed by a removable cover or lid 23 preferably of transparent glass, through which the operation of the device may be viewed. The cover 23 is supported upon the upper terminals of the ribs forming passages 10, said ribs terminating, as will be seen, a short distance below the upper edge of container 9. Said cover 23 is provided with a suitable handle or knob 24.

In the operation of the device, the desired quantity of water is first placed in the receptacle 5, it being intended that the device will produce as many cups of coffee as there are compartments 16. Consequently, in operation, with the construction shown, enough water will be used to produce six cups of coffee, there being six compartments 16. The ground coffee will then be supplied to the compartments 16, each compartment being provided with enough coffee grounds to produce one cup of coffee. The cover 23 is then arranged in position and the heating element 6 set in operation. The heat generated by said heating element will cause the water in receptacle 5 to boil and expand, with the result that the water will rise in the passages 10 and the tributaries 11 leading thereto. As the heated water rises to the upper ends of said passages, it will be discharged through the openings 19 into the compartments 16 and on to the coffee grounds contained therein. By providing a plurality of openings 19, provision is made for graduation in the heating of the water, that is to say, with the arrangement employed, in the event of gentle heating of the water, causing the same to rise only to the lowermost openings 19, the latter only will be utilized for the discharge of the water from passages 10. In the event of more intense heating of the water causing the same to rise still higher in said passages, the next higher tier of openings will also be utilized for the discharge of the water, and in the event of maximum heating of the water, all of the openings 19 will be brought into operation. Thus, with this arrangement, provision is made for accommodating the device to slow, medium or rapid flow of water in the passages 10, depending upon the degree to which the receptacle 5 is heated.

As the water is discharged from the openings 19, it flushes the compartments 16 and through the coffee grounds therein, thereby extracting the flavor from the latter. After this flushing, the water passes through the openings in the sides of said compartments, dropping from the latter into the bottom of container 9, whence the same flows through the openings 14 back into the bottom of receptacle 5, completing a cycle of circulation. This cycle of circulation is completed in but a few moments of time, the circulation being continued so long as heat is applied to the receptacle. The coffee, when cooked, may be withdrawn from the device, as desired, through the faucet 7.

By rounding the underside of container 9, and by rounding the adjacent portion 25 of the receptacle, a flaring approach to the passages 10 is formed so that in the operation of the device, as the water boils or upward circulation thereof is induced, the water will be positively directed into the passages 10 and tributaries 11, thereby insuring circulation of the water in the desired direction. With this arrangement, a forced feed of liquid to the coffee ground compartments is insured. At the same time, this upward flow of the liquid in passages 10 results in the creation of a partial vacuum in the lower portion of container 9 below the coffee ground compartments. A positive and rapid circulation or flushing of the liquid through the compartments is thus insured, since the partial vacuum produced below said compartments will induce a downward suction in said compartments, as will be readily understood. The downwardly tapering or pyramidal form of said pockets also assists in the rapid passage or flushing of the liquid through the same.

The openings 19 extend horizontally, thus resulting in a lateral discharge into the compartments 16. This is of advantage in that the liquid will be deposited directly into said compartments immediately upon discharge from the passages 10 and without first striking a directing or deflecting surface, with the result that the temperature of the liquid will not be reduced before the same is brought into contact with the coffee grounds. The loss of temperature of the liquid before the same is brought into contact with the coffee grounds is one of the chief faults to be found in coffee making devices now on the market where the liquid is discharged vertically, that is, from an upwardly opening passage necessitating first an upward movement of the liquid after leaving the discharge passage before the same drops on to the coffee grounds, or in devices where the liquid first contacts with a directing or deflecting surface. In both of these cases, the temperature of the liquid is materially reduced and therefore rendered less effective in extracting the flavor from the coffee grounds. By the lateral discharge of the liquid on to the coffee grounds, this objection is overcome and a device of maximum efficiency produced.

By reason of the employment of a plurality of compartments for the coffee grounds, it will be seen that the device readily adapts itself for use in the concoction of various blends of coffee to suit individual tastes, inasmuch as with this arrangement, the various kinds of coffee grounds used may be deposited into the various compartments and the amounts thus accurately measured during the testing or blending operation.

Through the employment of a plurality of pockets or compartments for the coffee grounds, the bulk of the coffee grounds is divided up, preventing congestion or caking of the same, such as ordinarily results in percolators or similar coffee making devices where the coffee grounds are all confined in a solid mass in one compartment. Through the employment of pyramidal or many-sided compartments, as distinguished from round or circular compartments, eddying or whirling of the liquid therein is prevented, and rapid draining of the liquid therefrom facilitated, it being clear with a many-sided downwardly tapering form of compartment, the liquid on entering the same will pass directly through the grounds and out through the openings in the compartment, dropping therefrom or flowing down the sides of the latter to the point or apex thereof where the same will drop into the bottom of the container 9.

The device is also adaptable for use in the cooking of various other granular materials or cereals such, for instance, as rice. In this use of the device, the rice or other material, is deposited into the compartments 16 in the same manner as the coffee. Where the device is used for this purpose the compartments would, in all probability, be made larger than when the device is used for coffee making.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having thus described my invention, what I claim as new and desire to secure by Letters Patent is:

1. A coffee-making device comprising a receptacle; a container within said receptacle; a compartment within said container; and a water passage formed by and between the walls of said receptacle and container and leading from said receptable to said compartment.

2. A coffee-making device comprising a receptacle; a container within said receptacle; a compartment within said container; and a water passage leading from said receptacle to said compartment, said passage extending above said compartment and having a plurality of vertically spaced discharge openings.

3. A coffee-making device comprising a receptacle; an elevated compartment within said receptacle; a plurality of water passages leading from the bottom of said receptacle to said compartment; and an annular flaring approach common to and communicating with the lower ends of all of said passages.

4. A coffee-making device comprising a receptacle; an elevated compartment within said receptacle; a plurality of water passages provided adjacent the lateral wall of said receptacle, said passages leading from the bottom of said receptacle to said compartment and discharging laterally thereinto; and an annular flaring approach common to, and communicating with, the lower ends of all of said passages.

5. A coffee-making device comprising a receptacle; a container within said receptacle; an elevated compartment within said container; a plurality of water passages formed between the adjacent walls of said receptacle and container leading from the bottom of said receptacle to said compartment; and a flaring approach communicating with the lower ends of said passages, said approach being formed between the lower portions of the lateral walls of said receptacle and container.

6. A coffee-making device comprising a receptacle; a container within said receptacle having an opening at its lower end; a plurality of elevated foraminated compartments in said container; and a passage leading to each of said compartments from the bottom of said receptacle.

7. A coffee-making device comprising a receptacle; a container within said receptacle having an opening at its lower end; an elevated foraminated compartment; and a plurality of vertical channels formed in the outer side of said container constituting water passages leading from the bottom of said receptacle to said compartment.

8. A coffee-making device comprising a receptacle; a container within said receptacle having a rounded lower end and an opening in said end; an elevated foraminated compartment; and a plurality of vertical ribs provided in said rounded end and the lateral wall of said container forming water passages leading from the bottom of said receptacle to said compartment.

9. A coffee-making device comprising a receptacle; a container within said receptacle having an opening at its lower end; an elevated foraminated compartment in said container; passages leading from the bottom of said receptacle to said compartment; and branch passages leading from the bottom of said receptacle and communicating with said before mentioned passages.

10. A coffee-making device comprising a receptacle; a plurality of elevated foraminated compartments in said receptacle, each of said compartments being many-sided in horizontal section and tapering downwardly; and a passage leading from the bottom of said receptacle to each of said compartments.

11. A coffee-making device comprising a receptacle; a plurality of foraminated compartments in said receptacle; a passage leading from the bottom of said receptacle and discharging laterally into each of said compartments; and means cooperating with each compartment for preventing the discharge from the corresponding passage from being deposited into other compartments.

12. A coffee-making device comprising a receptacle; a plurality of elevated foraminated compartments in said receptacle; a passage leading from the bottom of each receptacle and discharging laterally into each of said compartments; and flanges at the sides of and projecting upwardly from each compartment for preventing the discharge from the corresponding passage from being deposited into other compartments.

13. A coffee-making device comprising a receptacle; a container fitting snugly within said receptacle and having its upper edge portion in threaded connection with the corresponding portion of said receptacle; vertical passages leading upwardly from the bottom of said receptacle, said passages being formed between the adjacent walls of said receptacle and container; a plurality of foraminated compartments arranged in the upper portion of said container; horizontal passages leading inwardly from said vertical passages toward and above said compartments; and a cover at the upper end of said container, the lower end of said container having an opening.

In witness whereof, I have hereunto subscribed my name.

EDWARD SPRAGUE, Jr.